(No Model.)

J. W. PUGH.
NUT LOCK.

No. 484,745. Patented Oct. 18, 1892.

WITNESSES:
J. M. Boyle
Earl Cilley

INVENTOR.
John W. Pugh
BY Gabriel J. Cilley
ATTORNEY.

UNITED STATES PATENT OFFICE.

JOHN W. PUGH, OF GRAND RAPIDS, MICHIGAN, ASSIGNOR OF ONE-THIRD TO THOMAS J. HAYNES, OF SAME PLACE.

NUT-LOCK.

SPECIFICATION forming part of Letters Patent No. 484,745, dated October 18, 1892.

Application filed April 20, 1892. Serial No. 429,966. (No model.)

*To all whom it may concern:*

Be it known that I, JOHN W. PUGH, a citizen of the United States, residing at Grand Rapids, in the county of Kent and State of Michigan, have invented a new and useful Nut-Lock, of which the following is a specification.

My invention relates to improvements in devices for preventing nuts from unscrewing from bolts when loosened by constant and continued use; and its objects are, first, to utilize the washer between the nut and the article secured as a base for securing the nut-lock, and, second, to so construct the washer that it will not turn with the nut. I attain these results by the mechanism illustrated in the accompanying drawings, in which—

Figure 1:
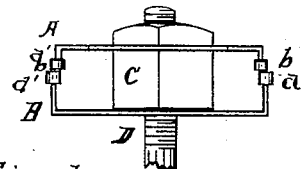
Figure 2:
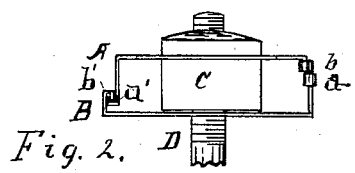
Figure 3:
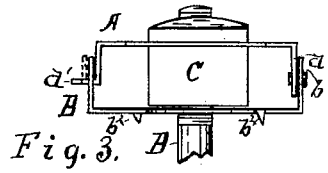
Figure 4:
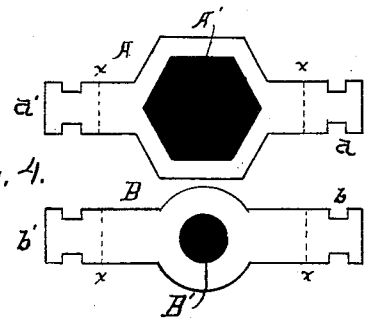
Figure 5:
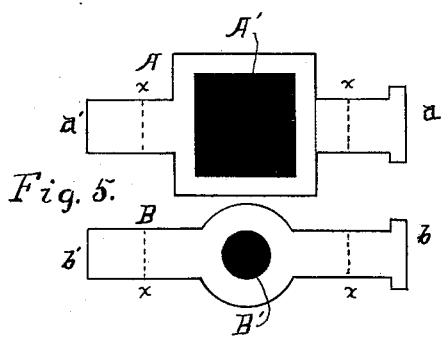
Figure 6:
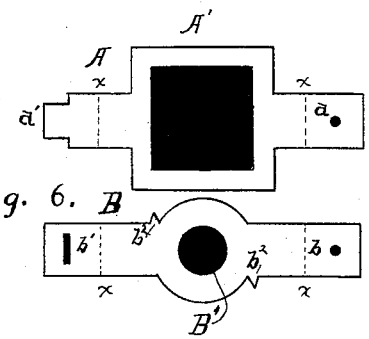

Figures 1, 2, and 3 are elevations of my lock with its several forms of fastening as applied to a nut, and Figs. 4, 5, and 6 are plans of the several forms of blanks from which my lock is made.

Similar letters refer to similar parts throughout the several views.

The lower portion B of my device is simply a washer, the aperture B' being of a proper size to receive the bolt D freely and the washer placed between the nut and the article secured; but instead of making this washer round (the usual form of washers) I extend an arm from each side of the washer proper, which arm terminates in fastening devices $b\ b'$, and where they are used to protect the surface of wood I provide one or more points $b^2$, which I turn down, as indicated in Fig. 3, so that as the nut is screwed down upon the washer the points are forced into the wood, thus preventing the washer from turning with the nut; but when used upon an iron surface these points are neither necessary nor available, as the projecting ends of the washer will in most cases prevent it from turning by coming in contact with some projecting portion of the iron, as the flange upon railway-rails, &c.

A represents the lock proper, which is made of any suitable material, having an aperture A' of a proper form and size to fit upon the nut, as represented in Figs. 1, 2, and 3, the balance of the lock being of the same general form of the washer. Both the lock and the washer are bent at right angles in the vicinity of the dotted lines $x\ x$, so that they may be brought together and locked by passing the end of each through and folding it around the other, as in Fig. 1, or one end of each may be folded crosswise and the two interlocked either at one or both ends, as shown at $a'\ b'$ in Fig. 2; or the end of one may be passed through a slot in the end of the other, as shown at $a'\ b'$ in Fig. 3, and the opposite end secured by a rivet, as in Fig. 3, by overlapping and folding, as in Fig. 2, by the slot and projecting end, or in any other suitable and available manner.

To apply these nut-locks, place the washer B over the end of the bolt D upon the surface of the body to be bolted and apply and screw the nut C solidly to place outside of the washer. Bend the ends of the washer at right angles at $x$. Place the lock over the nut, with the ends bent to interlock with the ends of the washers, and interlock them by any of the several devices hereinbefore described, or in any other suitable manner, so that the nut cannot be turned without removing the lock portion or cap A from over it.

Having thus fully described my invention, what I claim as new, and desire to secure by Letters Patent of the United States, is—

1. The combination, in a nut-lock, of a washer having extended ends provided with locking devices, and a cap having an aperture to fit over the nut, and extended ends provided with locking devices, each end of both the cap and the washer to be bent at right angles and to interlock with the corresponding end of the other, substantially as and for the purpose set forth.

2. The combination, in a nut-lock, of a washer having extended ends and provided with backwardly-projecting points and a cap fitted over the nut, the ends of each bent at right angles and interlocked with the corresponding end of the other, substantially as specified.

3. The combination, in a nut-lock, of a washer having extended ends, one of which is provided with a slot, the other with any suitable locking device, and a cap having an aperture to fit over the nut and both ends extended beyond the nut, one end of said cap fitted to enter the slot in the washer and the other end with a locking device corresponding with the opposite end of the washer, the ends of each bent at right angles and interlocked with the corresponding end of the other, substantially as and for the purpose set forth.

4. The combination, in a nut-lock, of a washer having extended ends, one end provided with a slot, the other with an aperture for a rivet, and points bent back from the surface of the washer, and a cap provided with an aperture to fit over the nut, and projecting ends fitted to interlock with the ends of the washer, and a rivet, substantially as and for the purpose set forth.

Signed at Grand Rapids, Michigan, this 4th day of April, A. D. 1892.

JOHN W. PUGH.

In presence of—
JETHIEL J. CILLEY,
L. D. STEWARD.